E. C. SMITH.
AGRICULTURAL MACHINE.
APPLICATION FILED MAR. 9, 1918.
1,270,453.
Patented June 25, 1918.
2 SHEETS—SHEET 1.
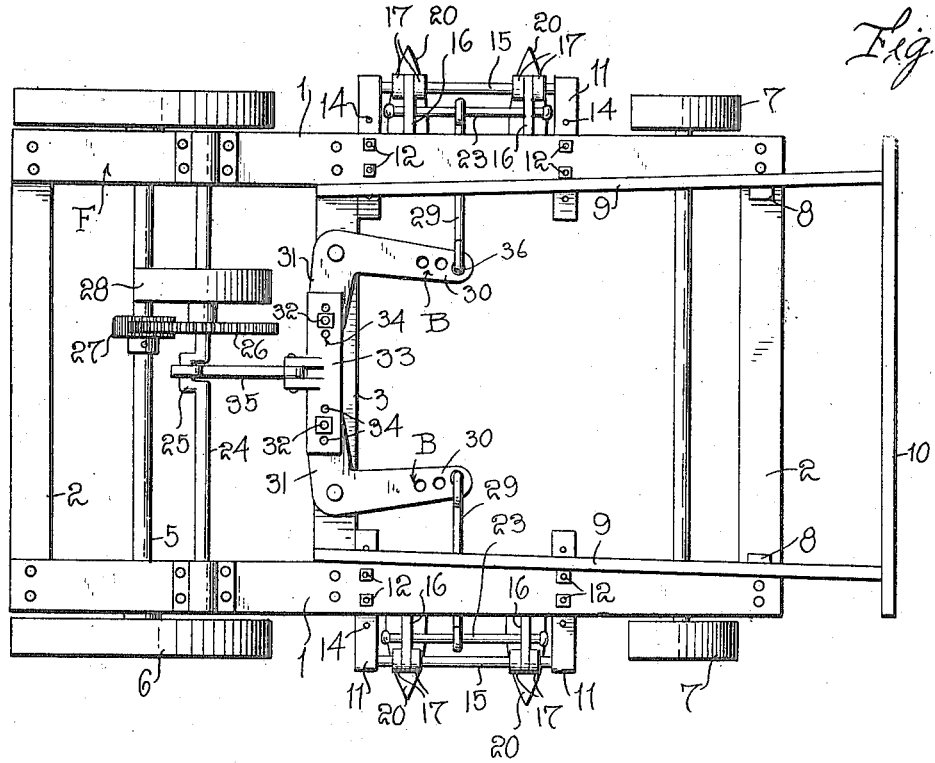
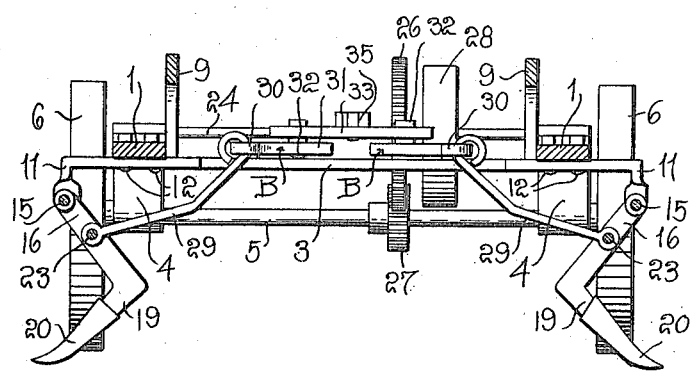
Inventor
Earl C. Smith
By Watson E. Coleman
Attorney

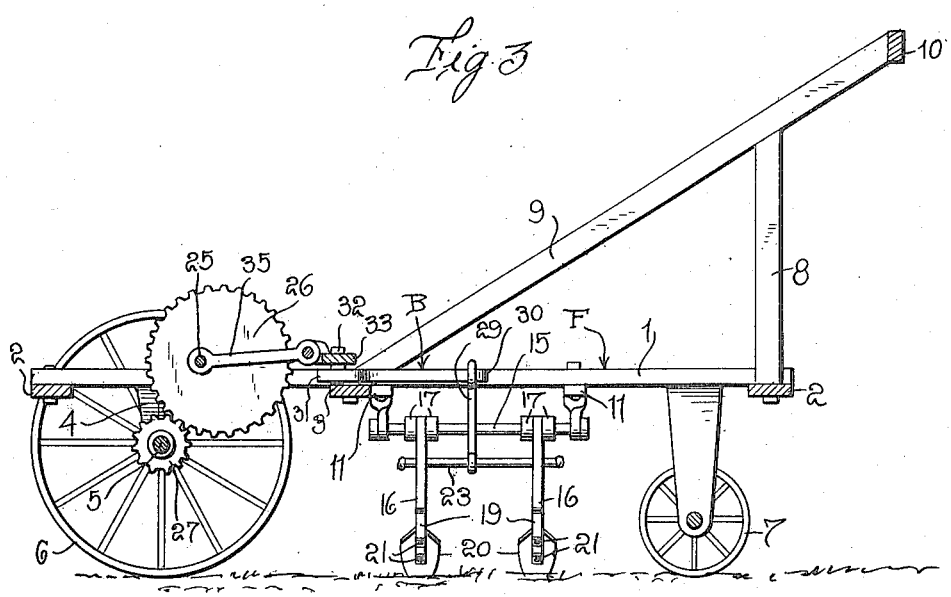

UNITED STATES PATENT OFFICE.

EARL C. SMITH, OF AUGUSTA, GEORGIA.

AGRICULTURAL MACHINE.

1,270,453.

Specification of Letters Patent.

Patented June 25, 1918.

Application filed March 9, 1918. Serial No. 221,530.

*To all whom it may concern:*

Be it known that I, EARL C. SMITH, a citizen of the United States, residing at Augusta, in the county of Richmond and State of Georgia, have invented certain new and useful Improvements in Agricultural Machines, of which the following is a specification, reference being had to the accompanying drawings.

This invention relates to certain improvements in agricultural machines and it is an object of the invention to provide a device of this general character having novel and improved means whereby it may be employed with convenience and facility as a cotton chopper or hoe and wherein the ground working elements embodied therein may be used for either of these purposes.

It is also an object of the invention to provide a novel and improved device of this general character including a portable body provided with ground engaging elements movable in a direction lateral to the direction of travel of the portable body and wherein said ground engaging members operate during the travel of the body.

Another object of the invention is to provide a novel and improved machine of this general character which is adapted to travel between two rows of adjacent plants and wherein said body at each side thereof is provided with a plurality of ground engaging elements mounted for oscillation in a direction transverse to the direction of travel of the body.

A still further object of the invention is to provide a novel and improved machine of this general character including a portable body provided with oscillating ground working elements positioned at opposite sides thereof together with means common to all of said elements for imparting the desired oscillation thereto.

Furthermore, it is an object of the invention to provide a novel and improved machine of this type including a portable frame provided at a side thereof with a series of movable ground working elements and wherein the elements comprised in said series may be adjusted one relative to the other in a direction longitudinally of the body or in the same general direction as the direction of travel of the body.

An object of the invention is also to provide a novel and improved device of this general character including a ground working element mounted for oscillating movement together with means whereby the extent of travel of the element may be regulated in accordance with the occasions of practice.

The invention consists in the details of construction and in the combination and arrangement of the several parts of my improved agricultural machine whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in top plan of an agricultural machine constructed in accordance with an embodiment of my invention;

Fig. 2 is a transverse vertical sectional view taken through my improved machine as herein set forth;

Fig. 3 is a view in longitudinal vertical section of my machine as herein disclosed;

Fig. 4 is a view in perspective of one of the arms as herein included which serves as a support for a rod with which certain of the ground working elements are connected;

Fig. 5 is an enlarged fragmentary view partly in elevation and partly in section illustrating in detail the mounting of one of the shanks or arms coacting with a ground working element; and Fig. 6 is a fragmentary view in perspective illustrating in detail the mounting of a ground working element.

As disclosed in the accompanying drawings F denotes a supporting frame or body preferably rectangular in form and which includes the side members 1, the end members 2 and the intermediate transverse member 3. Depending from the forward portions of the side members 1 are the transversely alined bearings 4 which rotatably support the axle 5. Fixed to the opposite end portions of the axle 5 and exteriorly of the frame or body F are the traction wheels 6 of any ordinary or preferred construction. Coacting with the rear portions of the side members 1 of the frame or body F are the ground engaging wheels 7 which serve as a support for the rear of the frame or body F. Extending upwardly from the rear end member 2 adjacent the opposite ends thereof are the posts or standards 8 to which are secured the upwardly and rearwardly inclined handle members 9. The forward or lower end portions of the members 9 are suitably secured to the intermediate member 3. It is also preferred that the upper or rear ends of the handle members 9 be connected by the transversely disposed bar 10 which is adapted to be grasped by the hands of the operator. It is also preferred that the upper or rear end portions of the handle members 9 terminate rearwardly of the frame or body F in order to facilitate the manipulation of the device.

While I have herein disclosed my invention as of a type adapted to be manually operated, I wish it to be understood that if preferred suitable draft rigging may be engaged with the forward cross member 2 or a suitable motor may be operatively engaged with the axle 5.

Extending outwardly and laterally from each of the side members 1 is a pair of arms 11. The arms 11 are detachably engaged with the coacting side member 1 through the medium of the bolts 12 passing through suitable openings 14 in the arms 11. It is to be noted that the openings 14 are of such a number as to permit a longitudinal adjustment of each of the arms 11 as the occasion may require.

Interposed between and supported by the outer end portions of each pair of arms 11 is a rod 15 which extends longitudinally of the frame or body F and loosely engaged with said rod 15 are the upper end portions of the shanks or arms 16 which are adapted for swinging movement in a direction transversely of the frame or body F. Coacting with each of the shanks or arms 16 and arranged at opposite sides thereof are the collars or sleeves 17 loosely mounted on the rod 15 and which are held against endwise movement on the rod through the medium of the binding screws 18. By this arrangement it will be perceived that the shanks or arms 16 may be adjusted one relative to the other longitudinally of the rod 15 and effectively maintained in its various positions.

The lower end portions of the arms or shanks 16 are provided with the outwardly directed extensions or feet 19 to which the ground working elements or shovels 20 are detachably engaged through the medium of the bolts 21. The bolts 21 are carried by the feet or extensions 19 and pass through suitable openings 22 in the element or shovel 20 and it is to be noted that the openings 22 are of such number as to permit an adjustment of the elements or shovels 20 longitudinally of the extensions or feet 19 in accordance with the requirements of practice.

The arms or shanks 16 have loosely disposed therethrough at a point below the rod 15 the opposite end portions of the rod 23 whereby the arms or shanks 16 may be swung or oscillated in unison in the same general direction.

Rotatably supported by the rear portion of the frame or body F is a transverse shaft 24 having interposed therein the crank 25 and said shaft adjacent the crank 25 has affixed thereto a gear wheel 26 in mesh with a gear 27 fixed to the axle 5. The shaft 24 has also affixed thereto the balance wheel 28 preferably positioned adjacent the side of the gear 27 remote from the crank 25. The balance wheel 28 serves to materially facilitate the rotation of the shaft 24 and which is of particular advantage when the machine is manually operated.

Operatively engaged with each of the rods 23 is a pitman 29 which extends inwardly of the frame F and has its inner end pivotally engaged with the rearwardly directed arm 30 of a bell crank lever B. The heel portion of the lever B is pivotally engaged for movement in a horizontal plane with the intermediate member 3. It will be at once self-evident that upon imparting rocking movement to the lever B the desired oscillation of the shanks or arms 17 will be obtained. The second arms 31 of the bell crank levers B are pivotally engaged as at 32 with the opposite end portions of the rigid link 33. The pivot members 32 are adapted to be engaged with the rigid link 33 at different points longitudinally thereof as afforded by the longitudinally spaced openings 34 produced in said link whereby the extent of swinging movement of the arms 30 of the bell crank levers B may be regulated. It will also be self-evident that the rigid link 33 serves to rock the bell crank levers B in unison but in reverse directions.

Operatively engaged with the link 33 at substantially its longitudinal center is a second pitman 35 which extends rearwardly and longitudinally of the frame or body F and has its rear end portion operatively engaged with the crank 25 interposed in the shaft 24. By this arrangement it will be at once self-evident that upon rotation of the shaft 24 the desired movement will be imparted to the link 33 to effect the necessary swinging movement of the bell crank levers B. My improved machine as herein disclosed is particularly adapted for use for hoeing purposes between two adjacent rows of corn or other plants and the oscillating movement of the ground engaging elements or shovels 20 results in an effective loosening or cultivating of the earth adjacent the plants at opposed sides of two rows without disturbing the plants. The ground engaging elements or shovels serve to effectively remove the weeds or the like. The construction of my improved machine is such as to make it possible to operate between rows of corn, cotton, etc., when the plants are too high for the use of the ordinary cultivators of the straddle wheel type. The adjustments of the arms 11, the ground engaging elements or shovels 20 and the adjustable connections between the link 33 and the arms 31 of the bell crank levers B makes it possible to arrange my improved machine to compensate for rows of different widths or to lengthen or shorten the strokes of the elements or shovels 20 as the occasions of practice may require.

When my improved machine is employed as a cotton chopper the shovels can be readily and conveniently positioned so as to chop or block the cotton out at regular intervals as may be required. It will also be self-evident that when employed as a cotton chopper my improved machine will coact with two rows at a single operation.

It is also desired that each of the arms 30 of the bell crank levers B be provided with a series of longitudinally spaced openings 36 so that the coacting pitman 29 may be connected to the arm 31 at different points longitudinally thereof to afford further means whereby the extent of swinging movement of the ground engaging element or shovel 20 may be regulated.

When it is desired to render the elements or shovels 20 inoperative the pitmen 29 may be suitably disconnected and the arms or shanks moved upwardly to cause the elements or shovels 20 to overlie and rest upon the side members.

From the foregoing description, it is thought to be obvious that an agricultural machine constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A machine of the class described comprising a portable frame, a pair of arms extending laterally from the frame, a rod interposed between and supported by said arms, ground working elements engaged with the rod and having swinging movement in a direction laterally to the direction of travel of the body, a second rod connecting the ground working members whereby the same are caused to swing in unison and in the same general direction, a pitman engaged with said last named rod, and means for reciprocating the pitman.

2. A machine of the class described comprising a portable frame, rock arms depending from opposite sides thereof, bell crank levers mounted upon the frame, one of said levers being operatively engaged with the arm at one side of the frame and the second lever with the arm at the opposite side of the frame, a rigid link connecting said bell crank levers whereby the same are caused to rock in unison but in reverse directions, and means coacting with the link for imparting movement to the levers.

3. A machine of the class described comprising a portable frame, rock arms depending from opposite sides thereof, bell crank levers mounted upon the frame, one of said levers being operatively engaged with the arm at one side of the frame and the second lever with the arm at the opposite side of the frame, a rigid link connecting said bell crank levers whereby the same are caused to rock in unison but in reverse directions, and means coacting with the link for imparting movement to the levers, the connections between the rigid link and the bell crank levers being adjustable.

4. A machine of the class described comprising a portable frame, a pair of arms extending laterally from the frame and adjustable longitudinally, a rod interposed between and supported by the outer end portions of the arms, ground engaging elements engaged with the rod for swinging movement in a direction laterally of the direction of travel of the body, said ground engaging elements being adjustable one relative to the other longitudinally of the rod, a second rod having its opposite end portions slidably engaged with the ground engaging members, and means operatively connected with the second named rod for imparting swinging movement to the ground engaging members in unison and in the same general direction.

5. A machine of the class described comprising a portable frame, a pair of arms extending laterally from the frame, a rod interposed between and supported by the outer end portions of the arms, ground engaging elements engaged with the rod for swinging movement in a direction laterally of the direction of travel of the body, said ground engaging elements being adjustable one relative to the other longitudinally of the rod, a second rod having its opposite end portions slidably engaged with the ground engaging members, and means operatively connected with the second named rod for imparting swinging movement to the ground engaging members in unison and in the same general direction.

In testimony whereof I hereunto affix my signature in the presence of two witnesses.

EARL C. SMITH.

Witnesses:
C. J. VAUGHAN,
SIDNEY BARTON.

Copies of this patent may be obtained for five cents each, by addressing the "Commissioner of Patents, Washington, D. C."